United States Patent
Siccardi et al.

(10) Patent No.: US 12,514,717 B2
(45) Date of Patent: Jan. 6, 2026

(54) TIBIO-FEMORAL TRIAL IMPLANT

(71) Applicant: MEDACTA INTERNATIONAL SA, Castel San Pietro (CH)

(72) Inventors: Francesco Siccardi, Castel San Pietro (CH); Massimiliano Bernardoni, Castel San Pietro (CH); Alessio Beccari, Castel San Pietro (CH); Alexander Nedopil, Woodbridge, CA (US); Stephen Howell, Elk Grove, CA (US)

(73) Assignee: MEDACTA INTERNATIONAL SA, Castel San Pietro (CH)

( * ) Notice: Subject to any disclaimer, the term of this patent is extended or adjusted under 35 U.S.C. 154(b) by 521 days.

(21) Appl. No.: 18/022,682

(22) PCT Filed: Sep. 9, 2021

(86) PCT No.: PCT/IB2021/058196
§ 371 (c)(1),
(2) Date: Feb. 22, 2023

(87) PCT Pub. No.: WO2022/064310
PCT Pub. Date: Mar. 31, 2022

(65) Prior Publication Data
US 2023/0310180 A1 Oct. 5, 2023

(30) Foreign Application Priority Data
Sep. 25, 2020 (IT) .......................... 102020000022741

(51) Int. Cl.
*A61F 2/46* (2006.01)
*A61F 2/38* (2006.01)

(52) U.S. Cl.
CPC .......... *A61F 2/4684* (2013.01); *A61F 2/3859* (2013.01); *A61F 2/389* (2013.01); *A61F 2/461* (2013.01)

(58) Field of Classification Search
CPC ...... A61F 2/4684; A61F 2/3859; A61F 2/389; A61F 2250/0097
See application file for complete search history.

(56) References Cited

U.S. PATENT DOCUMENTS 5,443,518 A * 8/1995 Insall ........................ A61F 2/38
  623/20.21
5,683,470 A * 11/1997 Johnson ............. A61B 17/1675
  606/88

(Continued)

FOREIGN PATENT DOCUMENTS

WO 2013063375 A1 5/2013
WO 2015160852 A1 10/2015

OTHER PUBLICATIONS

International Search Report and Written Opinion issued in PCT/IS2021/058196, mailed Dec. 22, 2021, 11 pages.

*Primary Examiner* — Javier G Blanco
(74) *Attorney, Agent, or Firm* — Meunier Carlin & Curfman LLC (57) ABSTRACT

A tibial-femoral trial implant comprises a femoral trial insert, which comprises a medial condyle and a lateral condyle, and a tibial trial insert, which comprises a medial plate and a lateral plate. The implant further comprises a graduated reference system adapted to indicate the relative angular deviation between the femoral trial insert and the tibial trial insert about a vertical axis, passing through the center of a sphere defining the medial condyle of the femoral trial insert, following a roto-translational movement of the (Continued)

femoral trial insert from a first position, identifying a knee extension position, to a second position, identifying a knee flexion position.

9 Claims, 8 Drawing Sheets

(56) References Cited

U.S. PATENT DOCUMENTS

| | | | |
|---|---|---|---|
| 7,708,740 B1 | 5/2010 | Bonutti | |
| 8,986,390 B2* | 3/2015 | Wogoman | A61F 2/4684 |
| | | | 623/20.29 |
| 2010/0036499 A1* | 2/2010 | Pinskerova | A61F 2/38 |
| | | | 623/20.31 |
| 2013/0006371 A1* | 1/2013 | Wogoman | A61F 2/461 |
| | | | 623/20.21 |
| 2018/0243101 A1* | 8/2018 | Earl | A61F 2/4657 |

* cited by examiner

TIBIO-FEMORAL TRIAL IMPLANT

FIELD OF APPLICATION

The present invention relates to a tibial-femoral trial implant.

In the flexion-extension movement of a non-pathological knee, there is a natural relative rotation between the tibia and the femur. In particular, from extension to flexion, the femur rotates externally with respect to the tibia by rotating about the medial contact point between the tibia and the femur (medial pivoting); as a result, the lateral contact point between the tibia and the femur moves towards the posterior part of the lateral tibial plate.

The relative tibial-femoral rotation during the flexion-extension movement of the knee is an important aspect of knee function and can be altered following a total knee arthroplasty (TKA) surgery. This alteration can cause the reduction of internal rotation of the tibia, with the result of not restoring the normal functions of the joint.

Many parameters can influence the internal rotation of the tibia and external rotation of the femur in flexion and extension movements, such as implant design, component placement or orientation, thickness, tibial and femoral resection angulations.

The cuts made on the tibia and femur to obtain the coupling surface with a respective prosthesis may be imprecise and this can affect the ability of the femur to rotate with respect to the tibia, also preventing it from having the correct rotation of 20°. This causes pain in the patient because the tendons elongate to accommodate the imposed rotation or, alternatively, knee instability could occur because an intra or extra-rotation can lead to instability in the coupling between the two parts of the joint.

PRIOR ART

The possibility of intra-operatively evaluating, thus before positioning the definitive prosthesis, the internal rotation of the tibia with respect to the femur in the flexion-extension movement resulting from the surgical procedure just performed helps the surgeon estimate any limitations of knee function and prevent the aforementioned inconveniences from affecting the patient; being able to perform this evaluation before fixing the prosthetic components to the bone potentially allows correcting the resections and positioning just performed, in order to optimize implant performance.

To check the accurate movement of the femur on the tibia following bone resection, instruments which are purely robotic are currently used.

Robotic procedures are used intra-operatively, which include the aid of navigation systems which view the two parts of the knee from the outside with the trial implant inserted: following the cut and application of the trial prosthesis, the surgeon manually moves the patient's leg in flexion-extension. By capturing the movement of the knee, the computer is capable of providing an indication of how much the femur rotates with respect to the tibial plate.

Intra-operatively evaluating the extent of internal-external femoral rotation with respect to the tibia, in particular in the trialing step, is now possible in the case of CAOS (computer assisted orthopedic surgery), using navigation systems or robots. Therefore, before placing the final implant, trial implants or inserts are used on the patient and the leg is moved to evaluate the relative position between the femur and tibia in both the flexed and extended positions of the leg. Such a movement is filmed with special cameras and analyzed by computer.

Other techniques used to obtain the required data are computed tomography, magnetic resonance, or radiography.

A guide for the placement of a tibial component for use in a knee arthroplasty procedure is described in WO 2015/160852.

All the aforementioned procedures are not without problems because the use of robotic instrumentation requires having adequate means (computers, cameras, tomography or magnetic resonance equipment, dedicated staff) to follow the navigation inside the operating room.

Often such systems are not available to surgeons because they are associated with bulky and expensive devices and equipment.

Furthermore, the use of such systems involves long operating procedures or the systems are oversized for the sole purpose of measuring the internal/external rotation of the femur during the flexion-extension movement of the knee.

The use of computed tomography (CT) or magnetic resonance imaging (MRI) to check correct femoral-tibial alignment may result in the need to perform multiple pre-operative CT or MRI scans, with the consequent lengthening of operative and pre-operative times.

The use of radiographs involves drawbacks as well, since during the emission of the X-rays the entire medical team must leave the operating room or be adequately protected; moreover, although the patient is adequately protected, he is also irradiated by radiation.

Therefore, the technical problem underlying the present invention is that of suggesting a tibial-femoral trial implant which solves the drawbacks described in the prior art, which thus allows verifying the correct and accurate movement of the femur on the tibia intra-operatively to ensure the 20° external rotation of the femur with respect to the tibia.

It is a further object of the present invention to suggest a tibial-femoral trial implant which allows verifying the correct rotation of the femur on the tibia immediately, simply, rapidly, and without further increases in costs, lengthening of times, and complications of surgical procedures.

Lastly, it is the object of the present invention to provide a tibial-femoral trial implant which allows verifying the correct rotation of the femur on the tibia without the aid of robotic structures or other bulky equipment requiring specialized staff.

These and other objects are achieved by a tibial-femoral trial implant as described in the appended claims.

SUMMARY OF THE INVENTION

In particular, the present invention relates to a tibial-femoral trial implant comprising a tibial trial insert and a femoral trial insert. The tibial trial insert comprises a medial plate and a lateral plate, while the femoral trial insert comprises a medial condyle and a lateral condyle. The trial implant comprises a graduated reference system adapted to indicate the relative angular deviation between the femoral trial insert and the tibial trial insert about a vertical axis, passing through the center of a sphere defining the medial condyle of the femoral trial insert, following a roto-translational movement of the femoral trial insert from a first position, identifying a knee extension position, to a second position, identifying a knee flexion position. The tibial trial insert has a flat lower surface and an opposite upper surface defining a tibial plate; said tibial plate comprises a medial plate having an articular surface (corresponding to an upper surface) which is concave and counter-shaped to a convex articular surface (corresponding to a lower surface) of the medial condyle of the femoral trial insert, so that said medial plate is tangent to and houses the sphere defining the medial condyle of the femoral trial insert.

The vertical axis about which the rotation of the femoral trial insert occurs with respect to the tibial trial insert is orthogonal to the lower surface of the tibial trial insert.

The graduated reference system comprises a plurality of reference marks extending from the upper surface to a front surface of the medial plate of the tibial trial insert.

The graduated reference system further comprises a notch obtained on an anterior surface of the medial condyle of the femoral trial insert; said notch being obtained by the intersection between the anterior surface of the medial condyle of the femoral trial insert and a plane passing through the center of the sphere defining the medial condyle of the femoral trial insert, orthogonal to the lower surface of the tibial trial insert.

The plurality of reference marks comprises a central notch contained in a plane passing through the center of the sphere, housable on the medial plate, defining the medial condyle of the femoral trial insert; the plane passing through the center of the sphere is orthogonal to the lower surface of the tibial trial insert and parallel to a sagittal plane of the tibial trial insert itself.

The plurality of reference marks comprises a plurality of angularly equally spaced lateral notches on both sides of the central notch.

Each lateral notch is spaced from the adjacent notch by an angular width of 5°, defining overall an interval, with respect to the central notch, having a width of ±20°.

The notch obtained on the femoral trial insert aligns with one of the lateral notches on the tibial trial insert to provide the measurement of the angular deviation of the femur with respect to the tibia following a flexion movement.

BRIEF DESCRIPTION OF THE DRAWINGS

The present invention will become more apparent from the following detailed description, with reference to the accompanying drawings merely provided by way of example, in which.

DETAILED DESCRIPTION

In the aforementioned figures, reference numeral 1 indicates as a whole a tibial-femoral trial implant in accordance with the present invention.

The trial implant 1 of the present invention is intraoperatively used to verify the correct relative movement between the tibia T and the femur F during the flexion-extension movement of the leg and, consequently, the correctness of the execution of the cut tibial and femoral surfaces on which the final implant is to be grafted.

In the flexion-extension movement of a non-pathological knee there is a relative rotation between the tibia T and the femur F. In particular, from extension to flexion, the femur F rotates externally with respect to the tibia T rotating about the medial contact point between the tibia and the femur (so-called medial pivoting): as a consequence, the lateral contact point between the tibia and the femur moves towards the posterior part of the lateral tibial plate.

Therefore, the relative rotation of the tibia and femur during the flexion-extension movement of the knee is a roto-translational movement.

Frontally observing a knee of a person in an upright position, when the leg is extended the tibia and femur are both vertically aligned along a plane parallel to the frontal plane of the person's body (or orthogonal to the transverse plane of the person), when the leg is instead flexed, the tibia remains substantially vertical while the femur bends 90°, orienting itself horizontally and thus moving in a position parallel to the transverse plane of the person's body (or orthogonal to the frontal plane of the person).

During this movement, not only does the rotation of the femur about a horizontal axis orthogonal to the sagittal plane occur, but also a rotation about a vertical axis V orthogonal to the transverse plane. The definition of such a vertical axis V will be explained below after describing the anatomy of a knee.

The knee is a complex joint consisting of the femur, tibia, fibula, and patella. The distal portion of the femur consists of the medial condyle and the lateral condyle, both of which are lined with cartilage. The medial condyle is the innermost and closest to the sagittal plane, while the lateral condyle is instead in a distal position with respect to the sagittal plane of the body. Anteriorly, the two condyles form a groove, called the femoral trochlea, which has the task of receiving the patella during the flexion-extension of the knee. The proximal portion of the tibia, in the articular part thereof, is called the tibial plate, and is divided into two hemi-plates, medial and lateral, covered with cartilage, which articulate with the medial and lateral femoral condyles, respectively. The two tibial hemi-plates are separated by two bony eminences defining the tibial spine.

The two femoral condyles are rounded protuberances placed at the distal end of the femur and allow the latter to articulate with the opposite concavity obtained on the tibial plate.

Thus, seen laterally, each condyle has a curvilinear shape and, specifically, the articular surface of the medial femoral condyle can be approximated to a sphere. Articular surface is intended as the external superficial portion of the femoral condyle which couples with the tibial plate.

The vertical axis V, orthogonal to the transverse plane and about which the femur rotates in the transition from the first knee extension position to the second knee flexion position, passes through the center of the sphere which can be imagined obtained at the medial condyle of the femur and externally tangent to the articular surface of the medial condyle.

The geometry of the articular surfaces is such as to allow, during flexion-extension movements, the external rotation of the femur (external rotation meaning a lateral rotation towards the outside of the body and therefore to the right for a right knee and to the left for a left knee), about a vertical axis V passing through the center of the sphere defined by the medial articular surface of the femoral condyle; the simultaneous 90° rotation of the femur, in the transition from extended to flexed position, involves a consequent posterior translation (therefore towards the back of the leg) of the contact point between the lateral condyle of the femur on the lateral tibial plate, as the flexion angle increases.

It is important to have an exact indication of the rotation angle of the femur about the vertical axis V. The anatomical width of such a rotation is defined, in the literature, as 20°.

In other words, with respect to the first position corresponding to the extended leg, and at which an angle value of 0° can be given, in the flexion position of the leg the femur rotates 20° outwards about the aforesaid vertical axis V.

Figure 5:
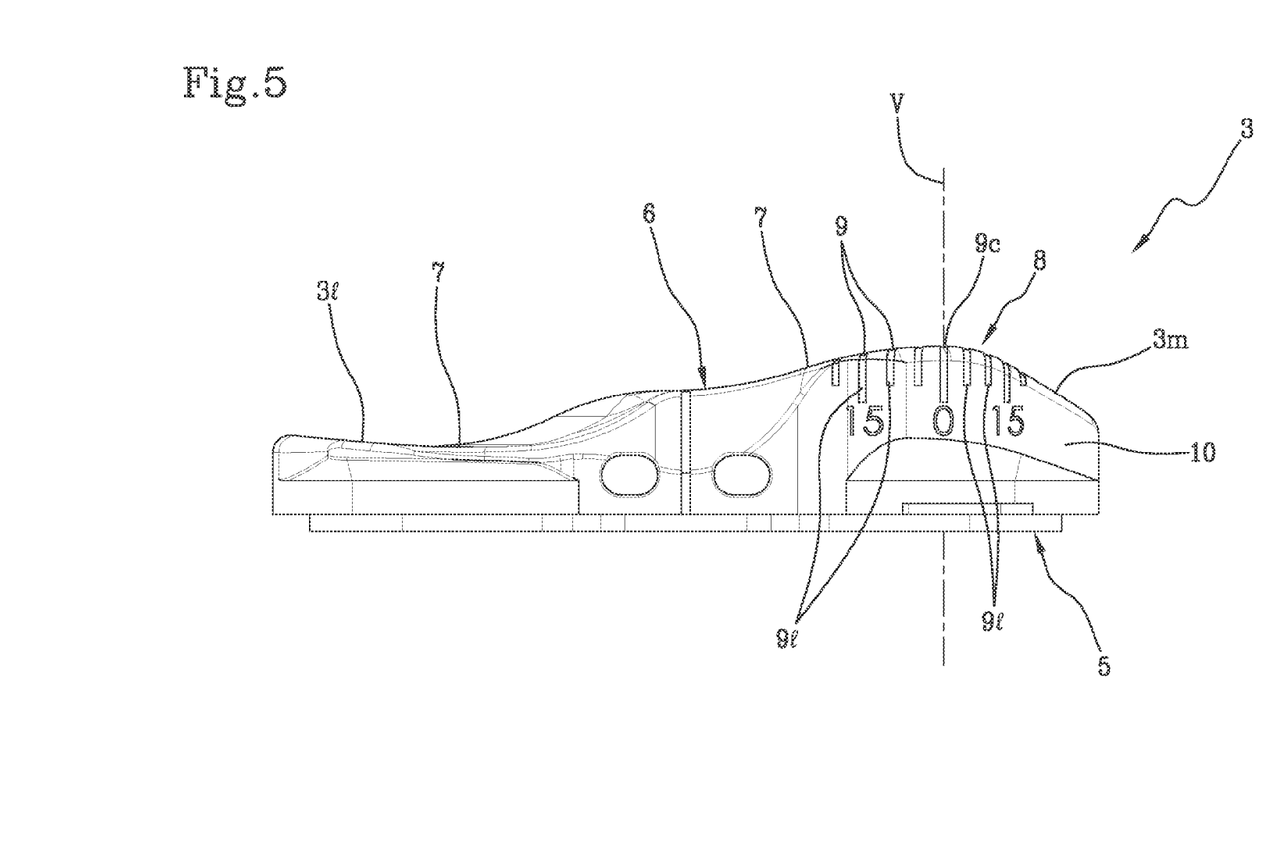
FIG. 5 is a front view of a tibial trial insert forming part of the trial implant of the present invention.
Figure 6:
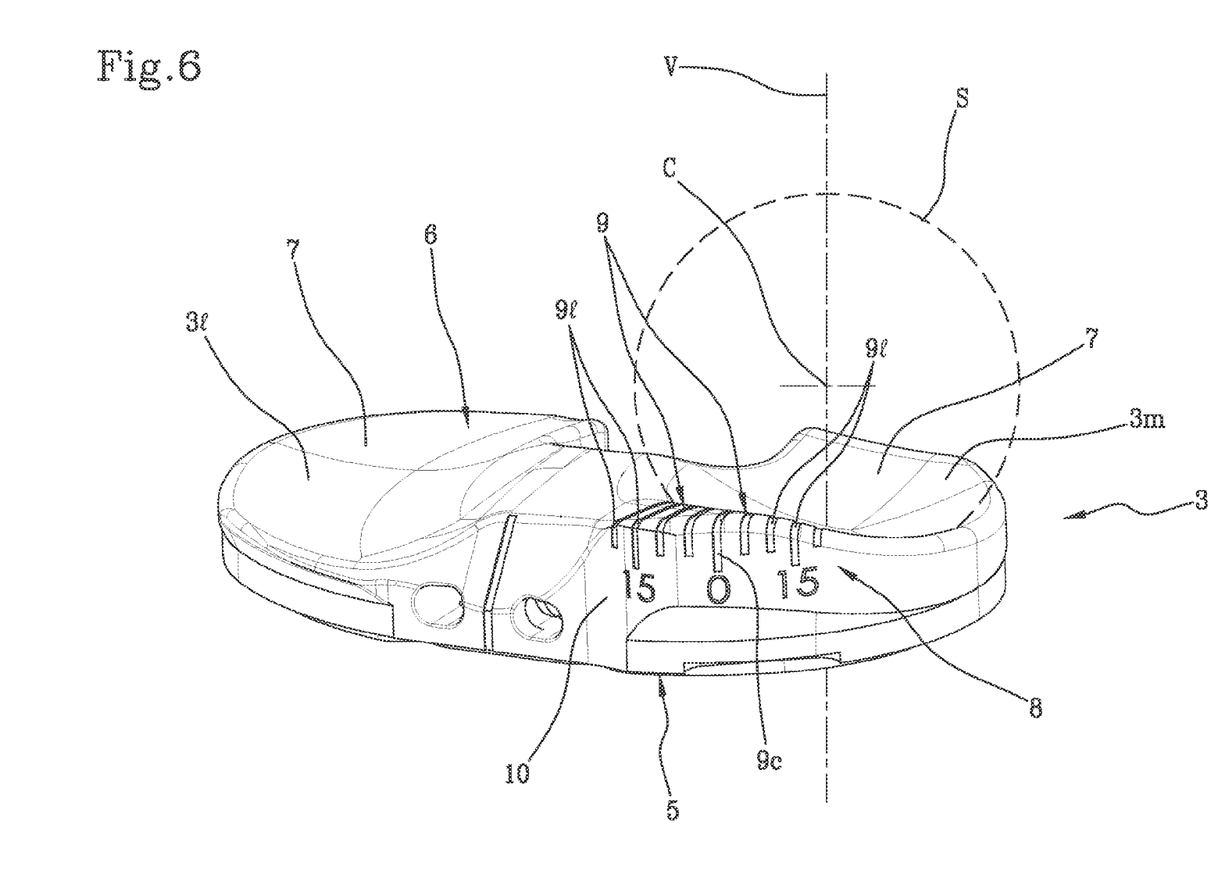
FIG. 6 is a front perspective view of the tibial trial insert shown in FIG. 5.
Figure 7:
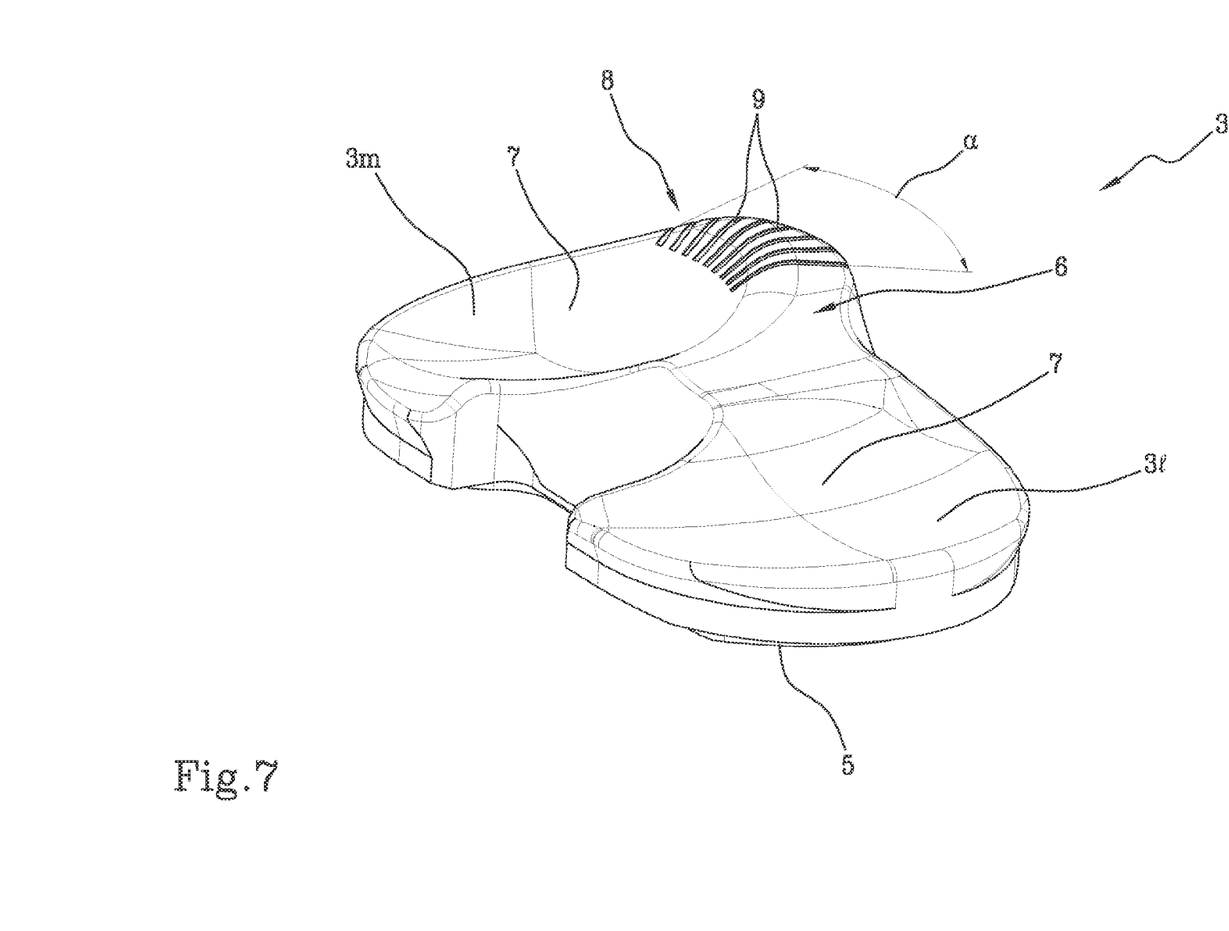
FIG. 7 is a rear perspective view of the tibial trial insert shown in FIG. 5.
Figure 8:
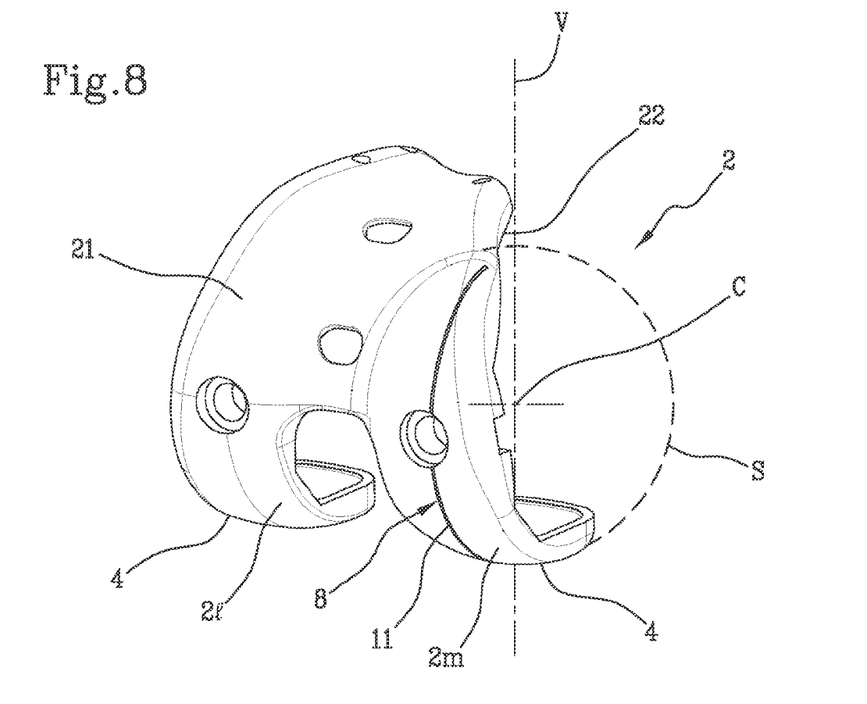
FIG. 8 is a front perspective view of a femoral trial insert forming part of the trial implant of the present invention.

The tibial-femoral trial implant 1 (FIGS. 1-4) of the present invention comprising a femoral trial insert 2 (FIGS. 8 and 9) and a tibial trial insert 3 (FIGS. 5-7), such as to articulate perfectly on each other.

For an easier reading of the description, and to simplify the understanding of the reference planes considered below, also for the single femoral and tibial components (and therefore for the single femoral and tibial trial inserts), sagittal, frontal, and transverse planes are defined in the same manner in which such planes are considered to refer to a person's body: therefore, the reference planes are named considering the trial inserts in use with extended legs and seen from the front.

The tibial trial insert 3 is constrained directly to the tibia or constrained to the tibia by means of a tibial trial base 3p; in both cases there is no relative movement between the tibial trial insert 3 and the tibia. The proximal end of the tibia is sectioned along a cutting plane on which the tibial base is associated (trial or definitive depending on whether a trial or definitive implant should be used).

Similarly, the femoral trial insert 2 is directly associated with the femur, suitably shaped along broken cutting lines which give the distal end of the femur a polygonal conformation. The femoral trial insert 2 is associated with pressure or by means of a bone connection pin.

The femoral trial insert 2 has, in side view (FIG. 9), a shell or C-shaped conformation, to embrace and house the distal end of the femur F, suitably shaped, inside the concavity thereof.

Figure 9:
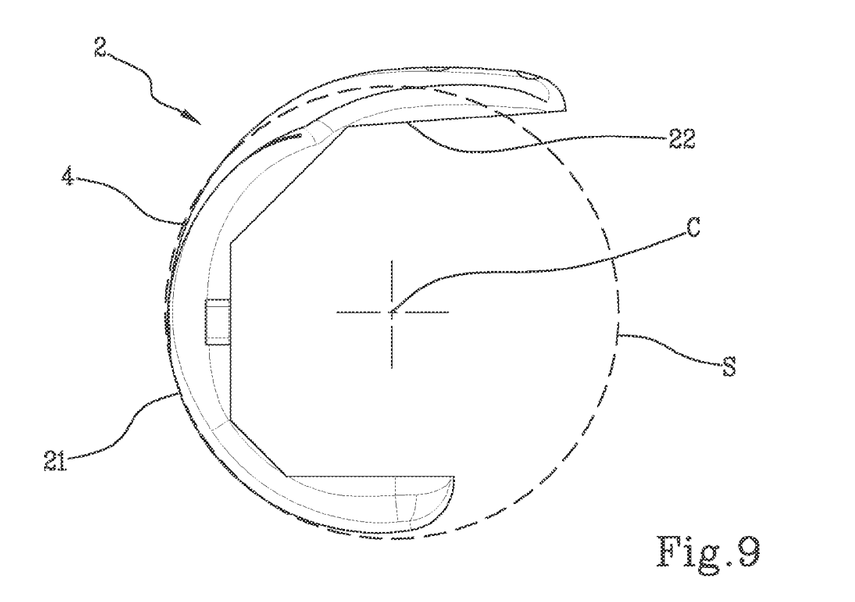
FIG. 9 is a side view of the femoral trial insert shown in FIG. 8.

Therefore, the femoral trial insert 2 has a convex anterior surface 21 and a concave posterior surface 22.

The concave posterior surface 22 is adapted to couple with the distal end of the femur and to house the femoral condyles in the concavity it defines. The anterior surface 21 instead comprises an articular surface 4 which is the external surface of the femoral trial insert 2 which couples with the tibial trial insert 3.

The femoral trial insert 2 and the tibial trial insert 3 reproduce the geometry of the distal end of the femur and the proximal end of the tibia, respectively.

The femoral trial insert 2 comprises a medial condyle 2m and a lateral condyle 21, both having a curvilinear and at least partially circular profile at the articular surface 4.

The articular surface 4 of the medial condyle 2m of the femoral trial insert 2 is spherical: in other words, the medial condyle 2m is defined by a spherical geometry, or by a portion of sphere S (FIG. 8) which is suitably cut to adapt the rest of the femoral trial insert 2 to the anatomy of the femur 2.

The articular surface 4 of the lateral condyle 21 is instead a cylindrical envelope and has a curvilinear profile with less accentuated curvature than that of the medial condyle.

The tibial insert 3 (FIGS. 5-7) has a flat lower surface 5 and an opposite upper surface 6 defining a tibial plate and comprising an articular surface 7. The tibial plate comprises a medial plate 3m, having a concave upper surface, and a lateral plate 31, having an upper surface with less pronounced curvature than the medial plate 3m.

The upper surface of the medial plate 3m of the tibial trial insert 3 is counter-shaped to the articular surface 4 of the medial condyle 2m of the femoral trial insert 2, so that the medial plate 3m houses the sphere S defining the medial condyle 2m of the femoral trial insert 2.

The vertical axis V passing through the center C of the sphere S is orthogonal to the lower surface 5 of the tibial trial insert 3.

Figure 1:
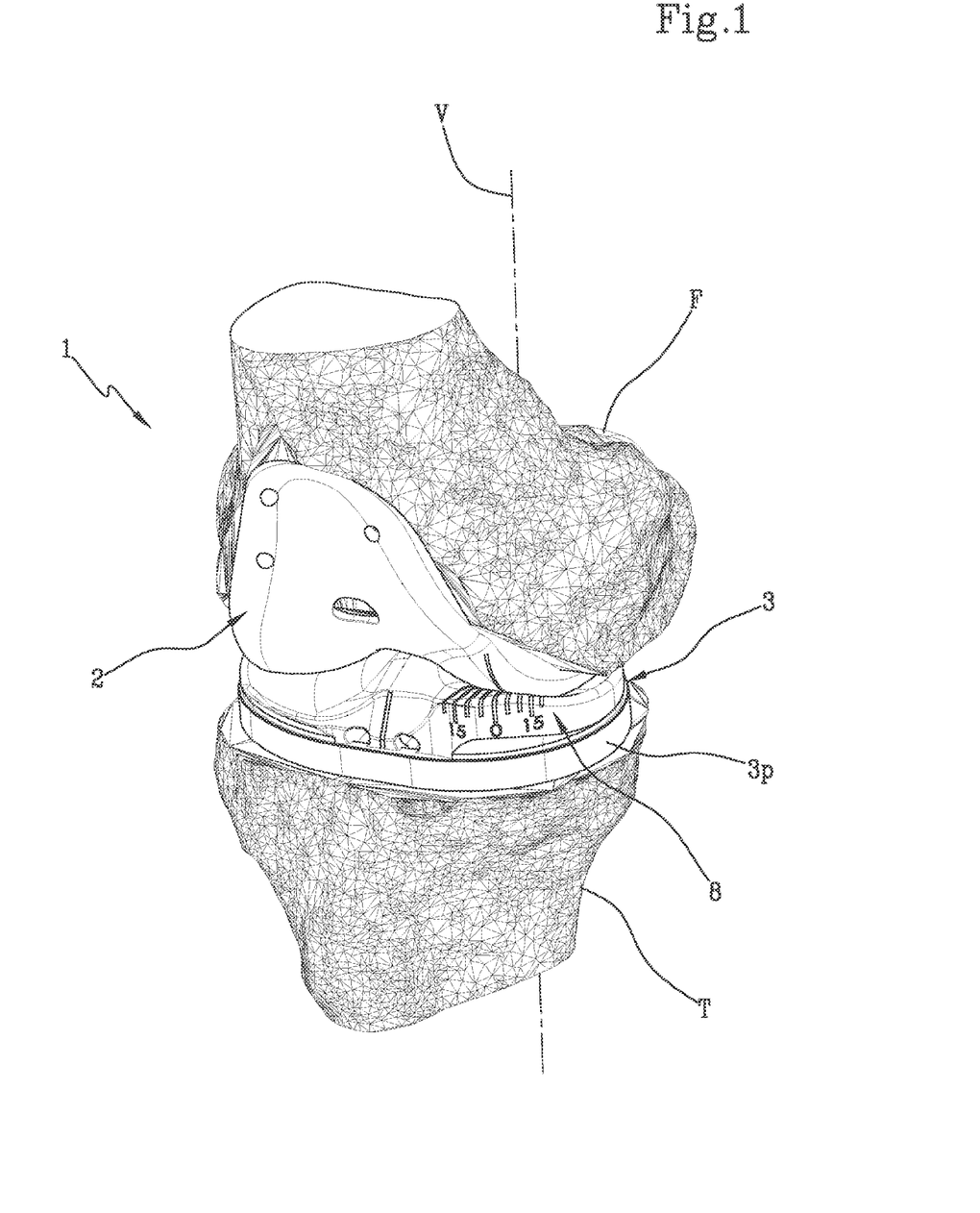
FIG. 1 shows a perspective view of a trial implant according to the present invention, implanted on a patient's right knee in a first operating position.
Figure 2:
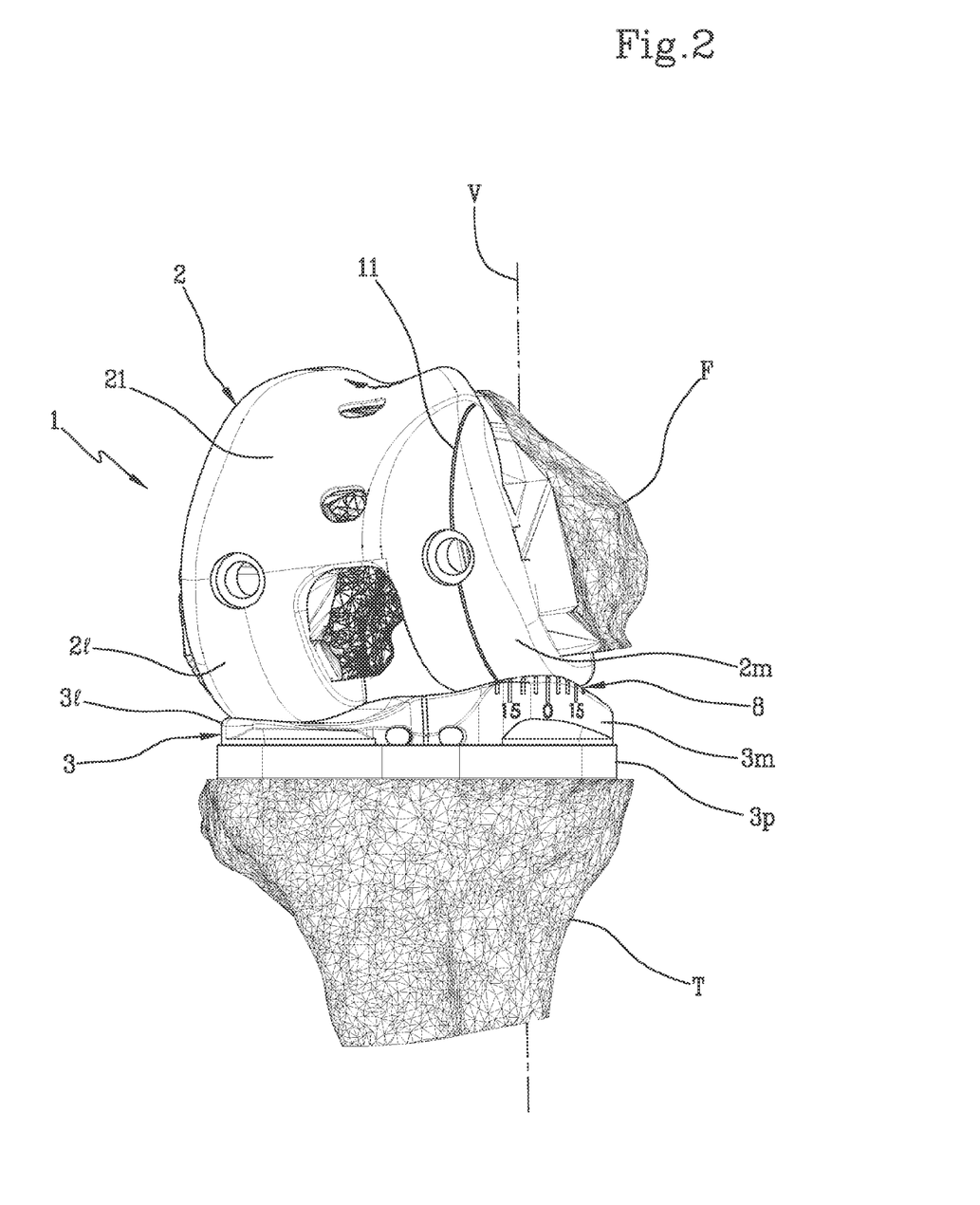
FIG. 2 shows a perspective view of a trial implant according to the present invention, implanted on a patient's right knee in a second operating position.
Figure 3:
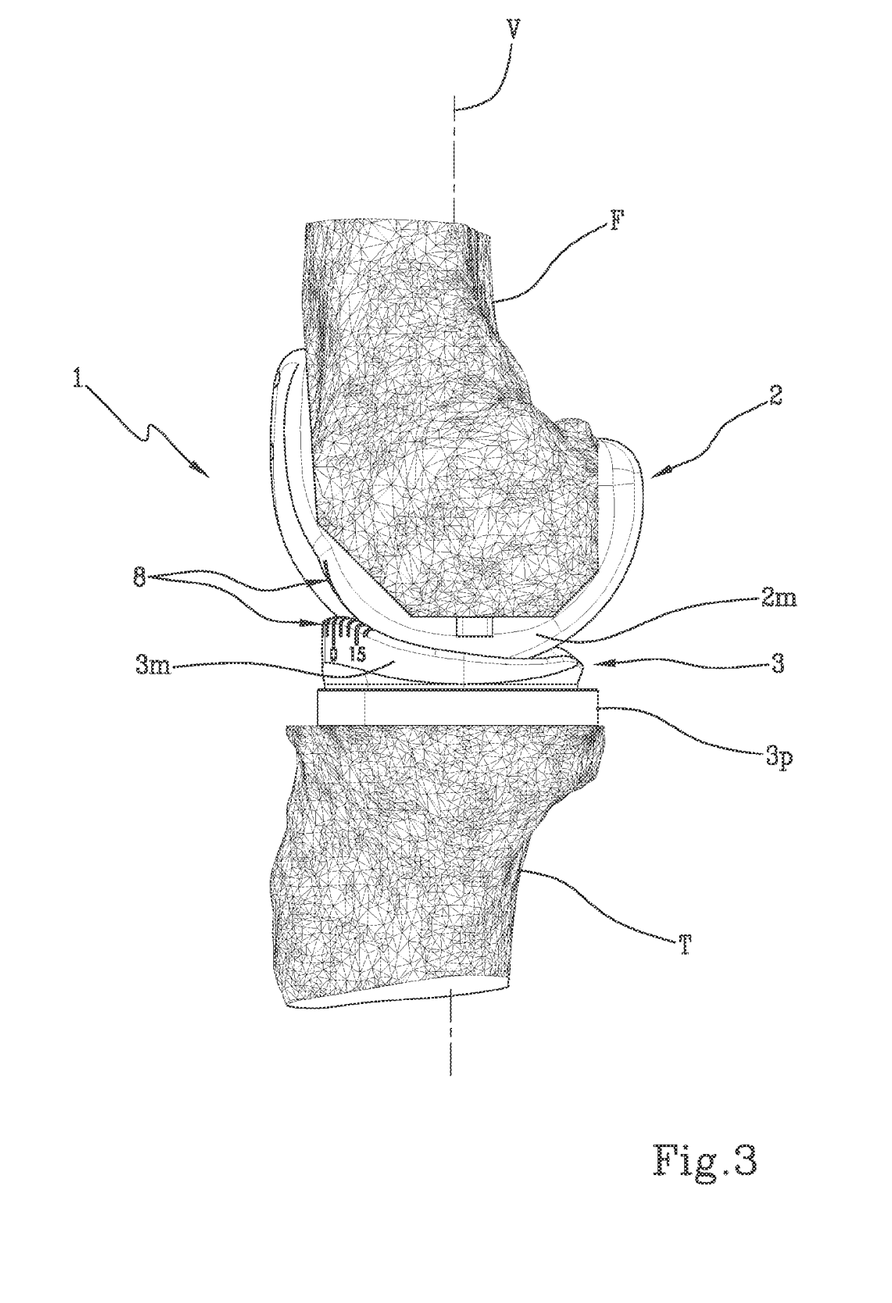
FIG. 3 shows a side view of the trial implant of the present invention implanted on a patient's right knee in a first operating position.
Figure 4:
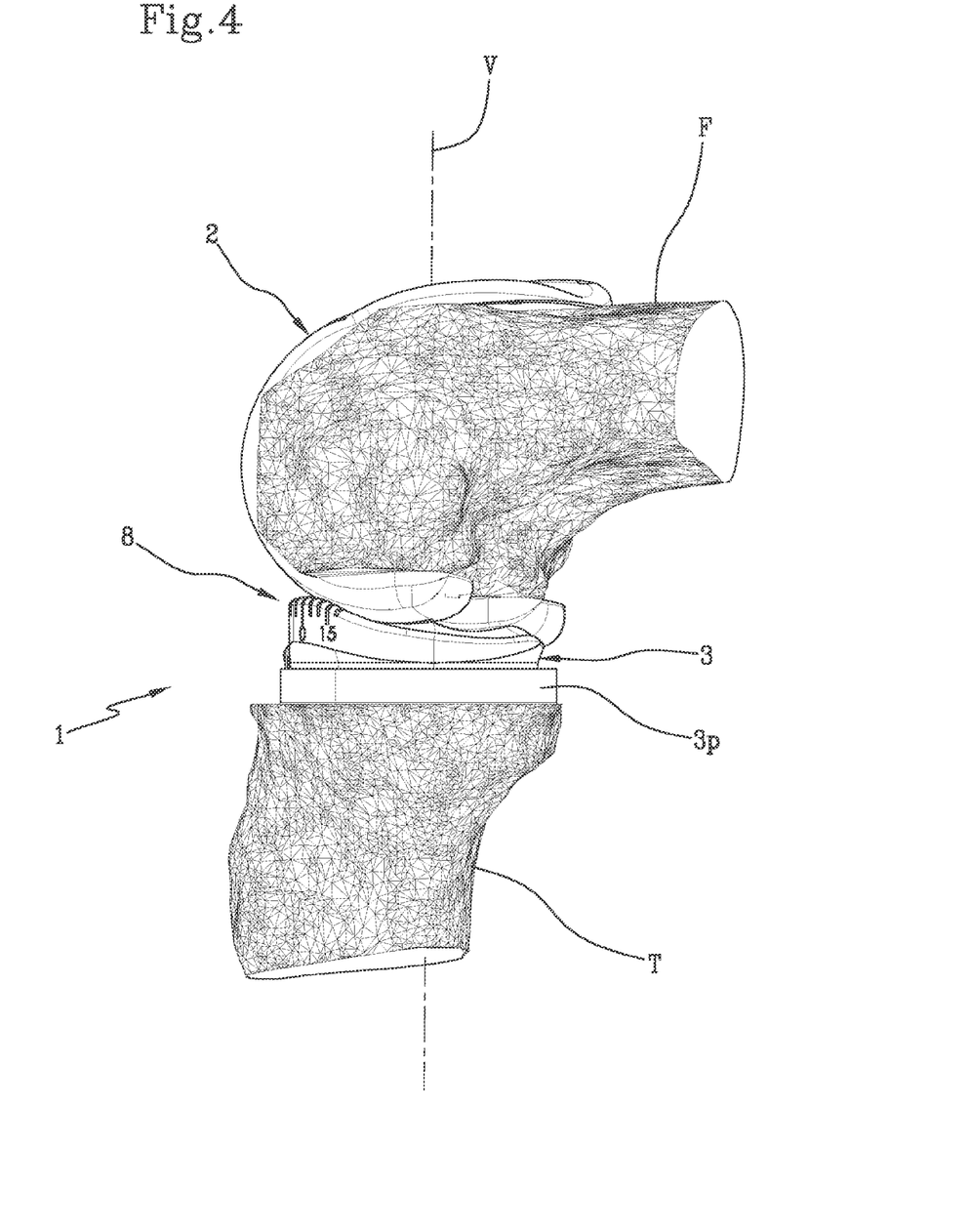
FIG. 4 shows a side view of the trial implant of the present invention implanted on a patient's right knee in a second operating position.

The tibial-femoral trial implant 1 further comprises a graduated reference system 8, adapted to indicate the rotation or relative angular deviation between the femoral trial insert 2 and the tibial trial insert 3 about the aforementioned vertical axis V passing through the center C of the S sphere defining the medial condyle 2m. Such a rotation about the vertical axis V is caused by a roto-translational movement of the femoral trial insert 2 in passing from a first position, identifying a knee extension position (FIGS. 1 and 3), to a second position, identifying a knee flexion position (FIGS. 3 and 4).

The graduated reference system 8 comprises a plurality of reference marks 9 extending from the upper surface 6 to a front surface 10 of the medial plate 3m of the tibial trial insert 3. Thereby, the graduated reference system 8 placed on the tibial trial insert 3 is visible to the surgeon with the leg both extended and flexed.

The plurality of reference marks 9 further comprises a central notch 9c contained in a plane passing through the center of the sphere, housable on the medial plate 3m, defining the medial condyle 2m of the femoral trial insert 2; said through plane is orthogonal to the lower surface 5 of the tibial trial insert 3 and parallel to a sagittal plane of the tibial trial insert 3 itself.

The plurality of reference marks 9 further comprises a plurality of lateral notches 91 equally spaced on both sides of the central notch 9c Each lateral notch 91 is spaced from the adjacent notch so as to identify an angle of 5°, defining overall an interval, with respect to the central notch 9c, having a width a of ±20°, thus identifying an angular interval of ±20° about the central notch 9c.

The graduated reference system 8 further comprises a notch 11 extending on the external frontal anterior surface 21 of the medial condyle 2m of the femoral trial insert 2, along the entire antero-posterior extension, and extending, at least partially, also on the articular surface 4, so that it is visible from the front when the femoral trial insert 2 articulates with the tibial trial insert 3 throughout the flexion-extension range of motion.

The notch 11 is obtained from the intersection between the anterior surface 21 of the medial condyle 2m of the femoral trial insert 2 and a plane passing through the center C of the sphere S defining the medial condyle 2m of the femoral trial insert 2, said plane being orthogonal to the lower surface 5 of the tibial trial insert 3.

Therefore, when in use, i.e., when the two inserts are associated with the respective femoral and tibial portions and articulate on each other, comparing the relative position between the notch 11 of the femoral trial insert 2 and the reference marks 9 obtained on the tibial trial insert 3, it is possible to evaluate the external rotation angle of the femur with respect to the tibia between any two flexion angles within a flexion angle range between 0° (fully extended leg) and 90° (leg in flexed position).

The angular deviation of the femoral trial insert 2 relative to the tibial trial insert 3 is given by the rotation of the first about the vertical axis V, orthogonal to the lower surface 5 of the tibial trial insert 3 and passing through the center of the sphere S, it is indicated by the alignment of the notch 11 obtained on the anterior surface 21 of the femoral trial insert 2 with one of the lateral notches 91 of the plurality of marks 9 obtained on the tibial trial insert 3. Depending on the flexion angle assumed by the femur with respect to the tibia during the transition from the extended to the flexed position of the knee, the external rotation of the femur with respect to the tibia assumes a position varying from 0° to 20°. By shifting the focus to the trial implant, flexing the leg to bring it from fully extended to flexed 90°, the notch 11 of the femoral trial insert 2 will slide through the plurality of reference marks to move from the center notch 9c to the outermost lateral notch 91, passing through the intermediate lateral notches 91 as the angle of flexion of the knee increases.

The trial implant with the graduated reference system 8 described above is innovative because it allows, with a simple, intuitive, and easily achievable device, at low cost, evaluating the external rotation of the femoral component in the flexion-extension movement on all prosthetic knee instruments.

With a view to restoring natural kinematics and optimizing the functionality of the prosthetic knee, the evaluation of external rotation through the trial implant is also useful for verifying the adequacy of the tibial and femoral resections and the positioning of the component before final implant installation.

In other words, the evaluation of the external rotation through the trial implant can represent a step in controlling the surgical procedure performed, which is useful in planning corrective resections with respect to the surgical steps already performed before fixing the implant component.

All this is obtained in a highly simple, absolutely inexpensive manner, which can be implemented on the normal tibial and femoral trial inserts normally used as intraoperative trial implants, it does not require the use of expensive, bulky, and complicated robotic systems, it can be easily utilized by the surgeon who has an immediate feedback on the extent of rotation between femur and tibia.

The invention claimed is:

1. A tibial-femoral trial implant comprising:
   a femoral trial insert, the femoral trial insert comprising a medial condyle and a lateral condyle, and
   a tibial trial insert, the tibial trial insert comprising a medial plate and a lateral plate,
   wherein the tibial-femoral trial implant comprises a graduated reference system formed on at least one of the femoral trial insert and tibial trial insert and adapted to indicate the relative angular deviation between the femoral trial insert and the tibial trial insert about a vertical axis, passing through the center of a sphere defining the medial condyle of the femoral trial insert, following a roto-translational movement of the femoral trial insert from a first position, identifying a knee extension position, to a second position, identifying a knee flexion position.

2. The trial implant according to claim 1, wherein said tibial trial insert has a flat lower surface and an opposite upper surface defining a tibial plate; said vertical axis being orthogonal to said lower surface of said tibial trial insert.

3. The trial implant according to claim 2, wherein said tibial plate comprises said medial plate which has an articular surface which is concave and counter-shaped to a convex articular surface of the medial condyle of the femoral trial insert, so that said medial plate is tangent to and houses the sphere defining the medial condyle of the femoral trial insert.

4. The trial implant according to claim 2, wherein said graduated reference system comprises a plurality of reference marks extending from the upper surface to a front surface of the medial plate of the tibial trial insert.

5. The trial implant according to claim 4, wherein said graduated reference system further comprises a notch obtained on an anterior surface of the medial condyle of the femoral trial insert, said notch being obtained by the intersection between said anterior surface of the medial condyle of the femoral trial insert and a plane passing through the center of the sphere defining the medial condyle of the femoral trial insert, orthogonal to the flat lower surface of the tibial trial insert.

6. The trial implant according to claim 4, wherein said plurality of reference marks comprises a central notch contained in a plane passing through the center of the sphere, houseable on said medial plate, defining the medial condyle of the femoral trial insert, said through plane being orthogonal to the lower surface of the tibial trial insert and parallel to a sagittal plane of the tibial trial insert itself.

7. The trial implant according to claim 6, wherein said plurality of reference marks comprises a plurality of lateral notches angularly equally spaced on both sides of the central notch.

8. The trial implant according to claim 7, wherein each lateral notch is spaced from the adjacent notch by an angular width of 5°, defining overall an interval, with respect to the central notch, having a width ($\alpha$) of ±20°.

9. The trial implant according to claim 7, wherein said notch obtained on the femoral trial insert aligns with one of the lateral notches present on the tibial trial insert to provide the measurement of the angular deviation of the femur with respect to the tibia following a flexion movement.

* * * * *